United States Patent
Sandhage

(10) Patent No.: US 11,292,948 B2
(45) Date of Patent: Apr. 5, 2022

(54) HEAT TRANSFER/STORAGE FLUIDS AND SYSTEMS THAT UTILIZE SUCH FLUIDS

(71) Applicant: Purdue Research Foundation, West Lafayette, IN (US)

(72) Inventor: Kenneth Henry Sandhage, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/931,982

(22) Filed: May 14, 2020

(65) Prior Publication Data

US 2020/0362217 A1 Nov. 19, 2020

Related U.S. Application Data

(60) Provisional application No. 62/847,881, filed on May 14, 2019.

(51) Int. Cl.
*C09K 5/12* (2006.01)
*F28F 23/00* (2006.01)
*F28D 20/00* (2006.01)

(52) U.S. Cl.
CPC .............. *C09K 5/12* (2013.01); *F28F 23/00* (2013.01); *F28D 2020/0047* (2013.01)

(58) Field of Classification Search
CPC ... C09K 5/00; C09K 5/02; C09K 5/06; C09K 5/063; C09K 5/08; C09K 5/10; C09K 5/12; F28D 20/0034; F28D 2020/0047; F28D 20/02; F28F 23/00; Y02E 60/14; Y02E 60/142; Y02E 60/145
See application file for complete search history.

(56) References Cited

U.S. PATENT DOCUMENTS

| | | | | |
|---|---|---|---|---|
| 3,605,720 A * | 9/1971 | Mayo | ...... | C09K 5/063 126/263.01 |
| 3,972,183 A * | 8/1976 | Chubb | ...... | F28D 20/003 60/641.8 |
| 3,997,001 A * | 12/1976 | Chubb | ...... | F28D 19/00 165/94 |
| 4,008,758 A * | 2/1977 | Chubb | ...... | C09K 5/063 165/94 |
| 4,244,350 A * | 1/1981 | Chubb | ...... | F28D 20/02 126/400 |
| 8,955,320 B2 * | 2/2015 | Xiang | ...... | C09K 5/04 60/641.8 |
| 9,273,883 B2 * | 3/2016 | Slocum | ...... | F24S 20/20 |
| 2013/0192792 A1 * | 8/2013 | Krakow | ...... | F28D 20/02 165/10 |
| 2014/0216027 A1 * | 8/2014 | Iida | ...... | C09K 5/063 60/529 |
| 2019/0225816 A1 * | 7/2019 | Dutta | ...... | C09K 5/12 |

FOREIGN PATENT DOCUMENTS

| | | | | |
|---|---|---|---|---|
| CN | 103160247 A | * | 6/2013 | |
| CN | 108728048 A | * | 11/2018 | .............. F24S 70/12 |
| WO | WO-2019075177 A1 | * | 4/2019 | .............. F24S 70/12 |

OTHER PUBLICATIONS

English language machine translation of Yang et al. (CN 103160247 A) (Year: 2013).*
Tian et al. ("Preparation of binary eutectic chloride/expanded graphite as high-temperature thermal energy storage materials," Solar Energy Materials & Solar Cells, 149, 2016, 187-194) (Year: 2016).*
English language machine translation of Yang et al. (CN 108728048 A) (Year: 2018).*
Liu et al. ("Corrosion behavior of Ni-based alloys in molten NaCl—CaCl2—MgCl2 eutectic salt for concentrating solar power," Solar Energy Materials and Solar Cells, 170, 2017, 77-86) (Year: 2017).*
Caldwell et al. ("Air-stable, earth-abundant molten chlorides and corrosion-resistant containment for chemically-robust, high-temperature thermal energy storage for concentrated," Materials Today, vol. 46, 2021, 9-17) (Year: 2021).*

* cited by examiner

*Primary Examiner* — Matthew R Diaz
(74) *Attorney, Agent, or Firm* — Hartman Global IP Law; Gary M. Hartman; Domenica N. S. Hartman

(57) ABSTRACT

Heat transfer/storage fluids that are resistant to oxidation in air at elevated temperatures, and systems that utilize such heat transfer/storage fluids, for example, as part of a concentrating solar power (CSP) system or other electricity-generating systems. The heat transfer/storage fluid is a molten chloride solution comprising two or more chlorides selected from the group consisting of $CaCl_2$, $SrCl_2$, $BaCl_2$, NaCl, and KCl.

6 Claims, 1 Drawing Sheet

HEAT TRANSFER/STORAGE FLUIDS AND SYSTEMS THAT UTILIZE SUCH FLUIDS

CROSS-REFERENCE TO RELATED APPLICATIONS

This application claims the benefit of U.S. Provisional Application No. 62/847,881 filed May 14, 2019, the contents of which are incorporated herein by reference.

STATEMENT REGARDING FEDERALLY SPONSORED RESEARCH OR DEVELOPMENT

This invention was made with government support under DE-EE0008532 awarded by the Department of Energy. The government has certain rights in the invention.

TECHNICAL FIELD

The present invention generally relates to high temperature heat transfer and thermal energy storage materials. The invention particularly relates to low-melting, cost-effective materials that are capable of resistance to oxidation in air at temperatures up to and exceeding 750° C., and also to containment materials that are capable of resistance to corrosion in fluids of types used in pipes, valves, pumps, and thermal energy storage tanks.

The drive for higher turbine inlet temperatures (generally exceeding about 550° C.) for enhanced heat-to-electricity conversion efficiency in concentrating solar power (CSP) plants and other electricity-generating systems (including nuclear power plants, hydrothermal power plants, and fossil-fuel-based power plants) has led to consideration of molten salts as heat transfer fluids and/or thermal energy storage (TES) fluids for such systems. However, low-cost, oxygen-bearing molten salts (e.g., nitrates, sulfates, carbonates) are not sufficiently stable for use at temperatures well in excess of about 550° C. Among halide liquids, certain fluorides (e.g., FLiNaK: LiF/NaF/KF, 46.5/11.5/42.0 mol %) have relatively high thermal conductivity and heat capacity values for enhanced heat transfer and TES systems. Unfortunately, such fluorides are relatively expensive, for example, in comparison to chlorides. Hence, despite lower thermal conductivity and heat capacity values, molten chlorides, such as ternary $MgCl_2$—KCl—NaCl compositions, have been of particular interest for large-scale CSP (and other electricity-generating) systems. However, $MgCl_2$-bearing fluids are susceptible to chemical interaction with oxygen and water vapor that, in turn, at temperatures exceeding 550° C. results in significantly enhanced corrosion of structural metal alloys, such as the nonlimiting examples of stainless steels that are conventionally used, and Ni-based superalloys that are being considered for use, to transport and store molten salts. While low contaminant levels in these fluids can be achieved by tightly sealing transport and storage equipment in combination with active monitoring and removal of oxygen-bearing species (e.g., with an oxygen gettering agent such as Mg or Ti), such efforts significantly increase the design complexity and operating costs of CSP (and other electricity-generating) plants.

In view of the above, alternative low-cost, low-melting heat transfer fluids and/or thermal energy storage fluids that are resistant to oxidation, and strategies for minimizing the corrosion of containment materials by such heat transfer fluids and/or thermal energy storage fluids, are needed for long-term, reliable, and effective heat transfer and TES at temperatures exceeding 550° C. in advanced CSP (and other electricity-generating) systems.

BRIEF SUMMARY OF THE INVENTION

The present invention provides fluids that are capable of use as heat transfer fluids and/or thermal energy storage fluids (hereinafter, collectively referred to as "heat transfer/storage fluid(s)" as a matter of convenience), resistant to oxidation in air at temperatures up to and exceeding 750° C., and capable of use in high-temperature heat transfer and thermal energy storage (TES) systems, as well as provides systems that utilize such a heat transfer/storage fluid, for example, as part of a concentrating solar power (CSP) system.

According to one aspect of the invention, a heat transfer/storage fluid is within a system in which the heat transfer/storage fluid is exposed to temperatures of at least 550° C., and the heat transfer/storage fluid is a molten chloride solution comprising two or more chlorides selected from the group consisting of $CaCl_2$, $SrCl_2$, $BaCl_2$, NaCl, and KCl.

According to another aspect of the invention, a system is provided that contains a heat transfer/storage fluid exposed to temperatures of at least 550° C., and the heat transfer/storage fluid is a molten chloride solution comprising two or more chlorides selected from the group consisting of $CaCl_2$, $SrCl_2$, $BaCl_2$, NaCl, and KCl.

Technical aspects of heat transfer/storage fluids and systems as described above preferably include a relatively low-cost, low-melting heat transfer/storage fluid that is resistant to oxidation when exposed to temperatures of 550° C. and above, and the capability of the heat transfer/storage fluid to minimize the corrosion of materials commonly used in systems that may utilize the heat transfer/storage fluid, as notable examples, stainless steels used to construct thermal energy transport and TES equipment of CSP plants and nickel-based superalloys being considered for thermal energy transport and TES equipment of CSP plants.

Other aspects and advantages of this invention will be appreciated from the following detailed description.

DETAILED DESCRIPTION OF THE INVENTION

The following describes heat transfer/storage fluids (as nonlimiting examples, heat transfer fluids and/or thermal energy storage fluids) that are resistant to oxidation in air at temperatures up to and exceeding 750° C., and further describes solid containment materials that are resistant to corrosion when contacted by such heat transfer/storage fluids in air at temperatures up to and exceeding 750° C. The heat transfer/storage fluids are molten chloride solutions comprising two or more chlorides selected from the group consisting of $CaCl_2$, $SrCl_2$, $BaCl_2$, NaCl, and KCl, and are intended to be capable for use in high-temperature heat transfer and thermal energy storage (TES) systems, and the solid containment materials are intended to be capable for use in thermal energy transport and TES equipment, such as, as nonlimiting examples, pipes, valves, pumps, and TES tanks of concentrating solar power (CSP) and other electricity-generating (nuclear power, fossil-fuel-based power, hydrothermal power) systems. As such, the heat transfer/storage fluids and containment materials are capable of use in robust CSP systems (and other electricity-generating systems) that may be air (leak) tolerant at temperatures exceeding 550° C., so as to reduce if not eliminate the need for costly hermetically-sealed thermal energy transport and TES equipment (as nonlimiting examples, pipes, valves, pumps, and tanks) and/or extensive molten salt chemical monitoring and/or gettering agents for removing oxygen-bearing species, hydroxyl-bearing species, and water from the molten salt.

Figure 1:
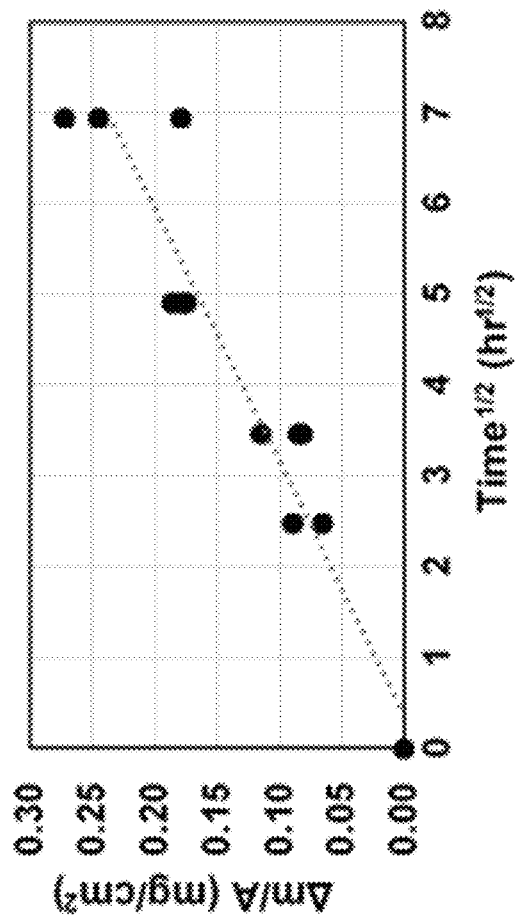
FIG. 1 is a graph depicting an X-ray diffraction pattern from a $CaCl_2$—NaCl (53 mol % $CaCl_2$, 47 mol % NaCl) salt solidified after exposure to air for 50 hours at 750° C.

A key factor for determining the suitability of a heat transfer/storage fluid to meet the above criteria is the relative thermodynamic stability of the heat transfer/storage fluid to oxidation, which may be described for molten chloride solutions by the following reactions:

$$\{MgCl_2\} + \tfrac{1}{2}O_2(g) = MgO(s) + Cl_2(g) \quad (1)$$

$$2\{KCl\} + \tfrac{1}{2}O_2(g) = K_2O(s) + Cl_2(g) \quad (2)$$

$$\{CaCl_2\} + \tfrac{1}{2}O_2(g) = CaO(s) + Cl_2(g) \quad (3)$$

$$2\{NaCl\} + \tfrac{1}{2}O_2(g) = Na_2O(s) + Cl_2(g) \quad (4)$$

where { } refers to species dissolved in a chloride liquid solution. The standard Gibbs free energy change $\Delta G°_{rxn}$) at a temperature of 750° C. for reaction (1) is negative (−44.3 kJ/mol), whereas $\Delta G°_{rxn}$ values at 750° C. for reactions (2), (3), and (4) are quite positive (+457.3, +143.5, +356.3 kJ/mol, respectively); that is, $MgCl_2$ oxidation is much more strongly favored than the oxidation of $CaCl_2$, KCl, and NaCl. Using activity data for $MgCl_2$ in a $MgCl_2$—KCl melt (32 mol % $MgCl_2$, 68 mol % KCl; $T_{eut}$=426° C.), and assuming unit activity for MgO(s), the equilibrium partial pressure ratio, $p[Cl_2]/(p[O_2])^{1/2}$, for reaction (1) at 750° C. is found to be 3.0 (where $p[Cl_2]$ refers to the partial pressure of $Cl_2(g)$ and $p[O_2]$ refers to the partial pressure of $O_2(g)$). Hence, reaction (1) will be favored at 750° C. ($MgCl_2$ should react to form MgO) in air ($p[O_2]$=0.21 atm) unless the chlorine partial pressure exceeds 1.4 atm. Using activity data for $CaCl_2$ in a $CaCl_2$—NaCl melt (53 mol % $CaCl_2$, 47 mol % NaCl; $T_{eut}$=504° C.) with unit activity for CaO(s), the equilibrium ratio, $p[Cl_2]/(p[O_2])^{1/2}$, for reaction (3) at 750° C. is found to be $2.3 \times 10^{-8}$. Hence, reaction (3) will not be favored in air once the local chlorine partial pressure exceeds $1 \times 10^{-8}$ atm (10 ppb); that is, the extent of $CaCl_2$ oxidation (to generate such an extremely low $Cl_2$ partial pressure) in this $CaCl_2$—NaCl melt in air at 750° C. should be negligible. Similar thermodynamic calculations indicate that KCl, NaCl, and $BaCl_2$ are even less prone to oxidation. FIG. 1 is a graph depicting an X-ray diffraction pattern from a $CaCl_2$-NaCl (53 mol % $CaCl_2$, 47 mol % NaCl) salt solidified after exposure to air for 50 hours at 750° C. and confirms that, unlike molten $MgCl_2$—KCl, the $CaCl_2$—NaCl liquid is resistant to forming solid oxides when exposed to air at 750° C., which is consistent with the thermodynamic calculations above.

Regarding salt evaporation rates, using available activity data for $CaCl_2$—NaCl (53 mol % $CaCl_2$, 47 mol % NaCl) and $MgCl_2$—KCl (32 mol % $MgCl_2$, 68 mol % KCl) melts, equilibrium vapor pressures of $CaCl_2$ and NaCl over such a $CaCl_2$—NaCl melt at 750° C. ($2.3 \times 10^{-8}$ and $3.4 \times 10^{-5}$ atm, respectively) were calculated to be lower than the equilibrium vapor pressures of $MgCl_2$ and KCl over such a $MgCl_2$-KCl melt at 750° C. ($7.3 \times 10^{-6}$ atm and $6.6 \times 10^{-5}$ atm, respectively). On this basis, it was concluded that the rate of evaporation of a $CaCl_2$—NaCl-based melt at 750° C. will be lower than for a $MgCl_2$—KCl—NaCl melt at 750° C. Because $BaCl_2(l)$ has a lower vapor pressure than $CaCl_2(l)$ at 750° C., the rate of evaporation of a $BaCl_2$—NaCl-based melt at 750° C. will also be lower than for a $MgCl_2$—KCl—NaCl melt at 750° C., and likely lower than the rate of evaporation of a $CaCl_2$—NaCl-based melt at 750° C. On this basis, molten chloride solutions comprising two or more chlorides selected from the group consisting of $CaCl_2$, $SrCl_2$, $BaCl_2$, NaCl, and KCl, including but not limited to molten $CaCl_2$-NaCl—$BaCl_2$ and $CaCl_2$—NaCl—$BaCl_2$—KCl salt solutions, are concluded to be suitable for use in heat transfer and TES systems operating at high-temperatures, such as at least 550° C. and above.

Other considerations for heat transfer/storage fluids that might be considered suitable for use in high-temperature heat transfer and TES systems include melting temperature and cost. Regarding salt melting points, $CaCl_2$—NaCl—$BaCl_2$ and $CaCl_2$—NaCl—$BaCl_2$—KCl salts have been reported with liquidus temperatures of 421 to 450° C., and molten chloride solutions comprising two or more of calcium chloride, strontium chloride, barium chloride, sodium chloride, and potassium chloride are believed to have liquidus temperatures of about 510° C. or less. Regarding cost, the cost per kWh of a $CaCl_2$—NaCl (53 mol % $CaCl_2$, 47 mol % NaCl) salt is much less expensive than a $NaNO_3$-$KNO_3$ (64 mol % $NaNO_3$, 36 mol % $KNO_3$) solar salt used at temperatures below 600° C., and it is anticipated that low-melting molten chloride solutions, comprising two or more chlorides selected from the group consisting of $CaCl_2$, $SrCl_2$, $BaCl_2$, NaCl, and KCl, will remain less expensive to use than $NaNO_3$-$KNO_3$ solar salt at operating temperatures up to and exceeding 550° C. Analyses based on commodity salt prices indicate that the cost per kWh of low-melting $CaCl_2$—NaCl—$BaCl_2$ and $CaCl_2$—NaCl—$BaCl_2$—KCl salts are within a factor of 1.5 of a $MgCl_2$—KCl—NaCl (40 mol % $MgCl_2$, 40 mol % KCl, 20 mol % NaCl) salt.

Materials suitable for transporting and containing molten chloride solutions, comprising two or more chlorides selected from the group consisting of $CaCl_2$, $SrCl_2$, $BaCl_2$, NaCl, and KCl, should be resistant to oxidation and reactive dissolution in such salts at temperatures up to and exceeding 550° C. in air. Consider the following reactions:

$$NiO(s) + \{CaCl_2\} = \{NiCl_2\} + CaO(s) \quad (5)$$

$$FeO(s) + \{CaCl_2\} = \{FeCl_2\} + CaO(s) \quad (6)$$

$$\tfrac{1}{3}Cr_2O_3(s) + \{CaCl_2\} = \tfrac{2}{3}\{CrCl_3\} + CaO(s) \quad (7)$$

$$\tfrac{1}{3}Al_2O_3(s) + \{CaCl_2\} = \tfrac{2}{3}\{AlCl_3\} + CaO(s) \quad (8)$$

Figure 2:
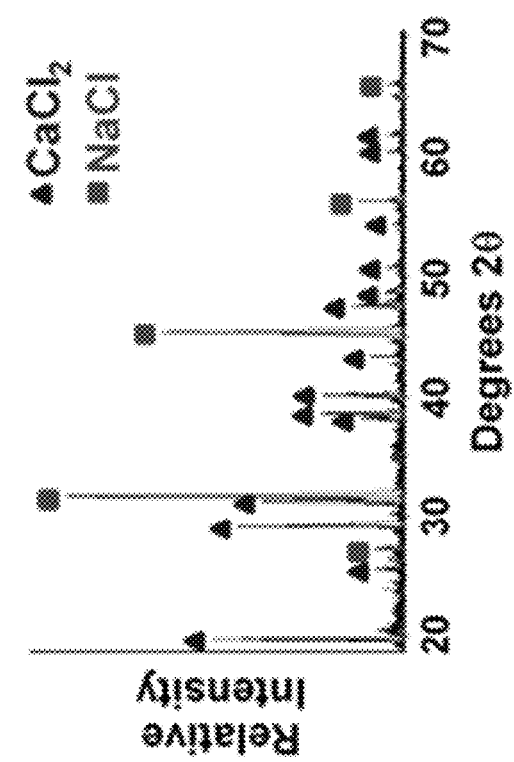
FIG. 2 is a graph depicting corrosion kinetics of a nickel specimen with a thickening NiO surface scale during exposure to a NiO-saturated $CaCl_2$—NaCl (53 mol % $CaCl_2$, 47 mol % NaCl) liquid in air at 750° C. Extrapolation yielded an annual Ni recession of about 13 micrometers.

$\Delta G°_{rxn}$ values for reactions (5), (6), (7), and (8) at 750° C. are +137.7 kJ/mol, +131.0 kJ/mol, +215.8 kJ/mol, and +258.9 kJ/mol respectively. Assuming unit activities for NiO(s), FeO(s), CaO(s), $Cr_2O_3(s)$, and $Al_2O_3(s)$, and using activity data for $CaCl_2$ in a $CaCl_2$—NaCl (53 mol % $CaCl_2$, 47 mol % NaCl) melt, the calculated equilibrium (saturation) activities for $\{NiCl_2\}$, $\{FeCl_2\}$, $\{CrCl_3\}$, and $\{AlCl_3\}$, in this salt at 750° C. are only $4.4 \times 10^{-8}$, $9.7 \times 10^{-8}$, $9.7 \times 10^{-18}$, and $4.9 \times 10^{-21}$, respectively. Hence, after extremely limited amounts of reaction, FeO and/or NiO and/or $Cr_2O_3$ and/or $Al_2O_3$ that form as a result of oxidation of an iron-containing or nickel-containing or chromium-containing or aluminum-containing alloy (as nonlimiting examples, a stainless steel or Ni-based superalloy) should be thermodynamically stable when contacted by a $CaCl_2$—NaCl-based liquid at 750° C. while exposed to air (or another oxygen-containing gas). After this saturation point, it is expected that the corrosion of FeO-forming or NiO-forming or $Cr_2O_3$-forming or $Al_2O_3$-forming metals in such liquids should shift to slow growth of the FeO or NiO or $Cr_2O_3$ or $Al_2O_3$ layers on the metal surfaces. FIG. 2 demonstrates a slow parabolic growth of a NiO scale on nickel during exposure to a NiO-saturated $CaCl_2$—NaCl liquid in air at 750° C. On the basis of this data, the projected nickel recession rate is about 13 μm/year at 750° C.

Other candidates for containment materials may form oxides or may contain or entirely consist of oxides, that are resistant to corrosion when contacted by a $CaCl_2$—NaCl-bearing liquid at 750° C. while exposed to air (or another oxygen-containing gas). Nonlimiting examples include materials that, as a result of oxidation, bear oxides of one or more of silicon oxide, magnesium oxide, calcium oxide, cobalt oxide, manganese oxide, titanium oxide, zirconium oxide, phosphorus oxide, and yttrium oxide. Notable examples include silicon-containing materials that form silicon oxide when subjected to oxidation conditions. Nonlimiting examples also include ceramic materials that contain or entirely consist of of one or more of aluminum oxide, chromium oxide, silicon oxide, magnesium oxide, calcium oxide, nickel oxide, iron oxide, cobalt oxide, manganese oxide, titanium oxide, zirconium oxide, phosphorus oxide, and yttrium oxide. Notable examples include silicon-containing materials that form silicon oxide when subjected to oxidation conditions.

From the above, it was concluded that $CaCl_2$-NaCl-based liquids are suitable as air-stable, low-melting (e.g., liquidus temperatures of 510° C. or less, and in some cases 450° C. or less), and inexpensive heat transfer/storage fluids for use as heat transfer fluids and/or thermal energy storage fluids in heat transfer and TES systems, and their use in combination with corrosion-resistant materials used as transport and storage (containment) equipment provides for robust, air (leak)-tolerant CSP systems at temperatures of at least 550° C. The use of such heat transfer/storage fluids and corrosion-resistant materials can significantly simplify the design, operation, and cost of high-temperature CSP systems by avoiding the additional costs associated with hermetic sealing of pipes and TES tanks and with extensive monitoring of the molten salt chemistry and with active gettering of oxygen-bearing species, hydroxyl-bearing species, and water from the heat transfer/storage fluid as it flows and is held at high temperatures in pipes and TES tanks. Such air-stable, low-melting chloride-based fluids are therefore believed to be highly attractive as heat transfer fluids and as fluids for thermal energy storage for a wide variety of electricity-producing systems, including but not limited to fossil-energy-based power plants, nuclear power plants, hydrothermal power plants, and solar energy power plants.

While the invention has been described in terms of particular embodiments and investigations, it should be apparent that alternatives could be adopted by one skilled in the art. For example, the heat transfer/storage fluids can be used in combination with various types of transport and containment equipment used in a wide variety of industries and applications, and appropriate materials could be substituted for those noted. As such, it should be understood that the above detailed description is intended to describe the particular embodiments and certain but not necessarily all features and aspects thereof, and to identify certain but not necessarily all alternatives to the embodiments and their described features and aspects. Accordingly, it should be understood that the invention is not necessarily limited to any embodiment described herein, and the phraseology and terminology employed above are for the purpose of describing the disclosed embodiments and investigations and do not necessarily serve as limitations to the scope of the invention. Therefore, the scope of the invention is to be limited only by the following claims.

The invention claimed is:

1. A system comprising containment equipment and a heat transfer/storage fluid that is transported or stored within the containment equipment and exposed to air and temperatures of greater than 550° C. within the system, the heat transfer/storage fluid being a molten salt solution of calcium chloride, sodium chloride, and barium chloride or calcium chloride, sodium chloride, barium chloride, and potassium chloride, and wherein the molten salt solution has a liquidus temperature of about 450° C. or less.

2. The system of claim 1, wherein the system is a heat transfer system or a thermal energy storage system or part of an electricity-generating system and the heat transfer/storage fluid is a heat transfer fluid or a thermal energy storage fluid.

3. The system of claim 2, wherein the electricity-generating system is a concentrating solar power system or a nuclear power system or a fossil-fuel-based power system or a hydrothermal power system.

4. The system of claim 1, wherein the heat transfer/storage fluid is in contact with a containment material of the containment equipment, and the containment material is an iron-containing material or a nickel-containing material or a chromium-containing material or an aluminum-containing material or a silicon-containing material.

5. The system of claim 1, wherein the heat transfer/storage fluid is in contact with a containment material of the containment equipment, and the containment material is an oxide-bearing material, wherein the oxide-bearing material is selected from the group consisting of one or more of aluminum oxide, silicon oxide, chromium oxide, magnesium oxide, calcium oxide, nickel oxide, cobalt oxide, manganese oxide, titanium oxide, zirconium oxide, phosphorus oxide, and yttrium oxide.

6. The system of claim 1, wherein the heat transfer/storage fluid is in contact with a corrosion-resistant containment material of the containment equipment, and the containment material exhibits a recession rate of less than 30 microns per year while in contact with the heat transfer/storage fluid in air at a temperature of at least 550° C.

* * * * *